Oct. 9, 1951     S. T. FARRELL ET AL     2,570,658
SELF-LOCKING NUT
Filed March 20, 1946
*Fig. 1*
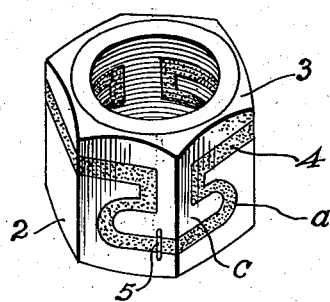
*Fig. 3*
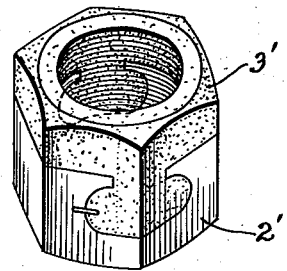
*Fig. 4*
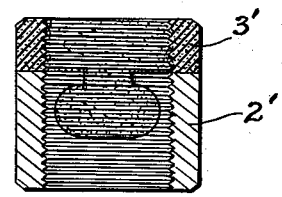
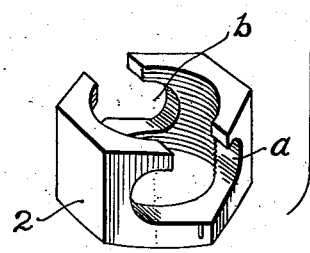
*Fig. 2*
INVENTORS:
Sydney T. Farrell
Frederick L. Farrell
BY
J. H. McCready,
ATTORNEY.

Patented Oct. 9, 1951

2,570,658

UNITED STATES PATENT OFFICE 2,570,658

SELF-LOCKING NUT

Sydney T. Farrell and Frederick L. Farrell, Belmont, Mass.

Application March 20, 1946, Serial No. 655,746

2 Claims. (Cl. 151—7)

This application is a continuation-in-part of our copending application Serial Number 504,658, filed October 2, 1943, now abandoned.

This invention relates to nuts of the type intended to be used on bolts, shafts, and the like. It is more especially concerned with nuts of the self-locking type, and it aims to devise a construction of this character which can be used with assurance that it will not back off under vibration, or other normal conditions of use.

The nature of the invention will be readily understood from the following description when read in connection with the accompanying drawings, and the novel features will be particularly pointed out in the appended claims.

In the drawings,

Fig. 1 is a perspective view of a nut embodying this invention;

Fig. 2 is an exploded view showing the three parts of the nut in perspective;

Fig. 3 is a view similar to Fig. 1 illustrating the invention embodied in a different form; and Fig. 4 is a vertical sectional view of the nut shown in Fig. 3.

Referring first to Figs. 1 and 2, the construction there shown comprises a nut body consisting essentially of two metallic parts or sections 2 and 3 and an intermediate resilient member 4. The two metallic sections are so shaped as to interlock loosely, one with the other, and the resilient member 4 is interposed between the surfaces provided for interlocking purposes so that the normal interlocking relationship of the sections is really effected through the presence of this intermediate resilient member.

Referring more particularly to the bottom member 2, as shown in Figs. 1 and 2, it will be seen that it may be regarded as a section of an internally threaded tube, in the side walls of which holes a and b have been formed in line with each other so that they cooperate with the axial bore of this part of the nut to form an aperture extending diametrically through it from one outer lateral surface of the nut to the other. Usually the nut will be made of hexagonal horizontal sectional form, or of some other shape adapted to take a wrench.

The other body section 3 of the nut also is a tubular, internally threaded piece of an hexagonal or other outline, corresponding to that of the body member 2. Its solid end portion has two depending legs terminating in enlargements c—c, including laterally extending lugs, and these enlargements are adapted to fit loosely in the holes a and b of the section 2. These parts are so dimensioned, however, as to provide a space of approximately uniform width between them into which the resilient member 4 is fitted.

This resilient member preferably is made of some elastic composition having a base of natural or synthetic rubber, or one of the resilient plastics, such as Koroseal, the composition being relatively firm but having a degree of elasticity approximating, for example, that of the tread of an automobile tire. Preferably it consists of a Koroseal, Thiokol, or some other plastic or synthetic rubber-base material which is not seriously attacked by oil, lubricants, and the like. We prefer to make it of somewhat sectional oval form, as illustrated in Figs. 1 and 2, and to make the meeting faces of the sections 2 and 3 which abut against it of complemental shape in order better to retain it in its operative position between the adjacent ends of the two body sections.

The body members may be made of steel, copper, or any other desired material, which necessarily will be selected in accordance with the requirements of individual uses.

In assembling the parts the section 3 is passed laterally over the section 2 in a direction at right angles to the common axis of these two parts thus sliding the parts c—c in the holes a and b. The resilient member 4 is thus interposed between the adjacent edges of these parts as they are brought together. When the parts of the nut are assembled in this manner, the assembly appears substantially as shown in Fig. 1, and in the completed nut the solid head members of the sections 2 and 3 form the opposite ends of the nut, while the extensions of these members project toward the opposite ends of the nut and are overlapped axially in the intermediate or body portion of the nut.

In using the nut it is simply threaded on a bolt, shaft, or other threaded member with which it cooperates, the internal threads formed on the parts 2 and 3 being made to fit the threads of such bolt, shaft, or the like. If the wrench is applied to only one of the members 2 or 3, then rotary motion will be imparted to the other body member through the cushioning material 4. Usually the inner surface of this member 4 is not threaded, except as threads may be cut in it by the threads of the bolt on to which it is turned, and this inner surface should project inwardly to a radial distance between the bottoms and tops of the internal threads of the nut body. When the nut has been completely tightened up, it is held securely against backing off by the resilient member 4 which exerts an elastic grip on the threads of the bolt, both radially and longitudinally or axially.

It should be noted that the engagement of this resilient member 4 with the threads of the bolt is relatively long in comparison to the axial length of the nut. Also, that because of the axially overlapped relation of the sections 2 and 3 of the nut, the same threads throughout a relatively long section of the bolt will be engaged by all three elements of the nut, and that the frictional engagement of the member 4 throughout this long distance is exceptionally effective in resisting any rotative movement of the nut on the bolt which otherwise might be produced by vibration or some similar agency. This fact contributes materially to the security of the nut.

The elements of the nut may be disconnected from each other by relatively removing them in the opposite direction from that employed in assembling them. And they may again be reassembled when desired. If such an operation is to be performed, it is preferable to make a mark 5, Fig. 1, on one side of the nut where parts of it will appear on all three elements. Thus, when the nut is reassembled with the parts in the same relationship, there will be no disturbance of the timing of the internal threads.

Figs. 3 and 4 show another embodiment of the invention in which the intermediate member 4 has been eliminated. In this device the bottom member 2' may be exactly like that shown at 2, but preferably is somewhat longer axially, and the upper body member 3' is made of a softer material than the bottom member. For example, it may be made of the same material as that used for the member 4, although usually it should be of a harder composition but still soft enough so that the threads in it will be cut by the bolt itself. For this reason the internal diameter of the member 3' should bear substantially the same relation to that of the body part 2', as above described in connection with the member 4. Thus in this form of the invention the upper body member 3' performs both the functions of the resilient member 4 and the upper body member 3 of the construction earlier described.

Where greater rigidity is required in this upper member 3' it may be made of a soft metal, such as aluminum, or one of the aluminum alloys. Aluminum has a "tacky" surface, which is particularly valuable for the purposes of this invention, and when a bolt has been allowed to cut its own thread in a nut, such as that shown in Figs. 3 and 4, having an aluminum top section, the resistance which it offers thereafter to the rotation of the nut on the bolt is ample to secure it against accidental backing off. No other metal, so far as we know, except aluminum and its alloys, has this characteristic to the degree necessary for the purposes of this invention.

It will be understood that while we have herein shown and described preferred embodiments of our invention, the invention is susceptible of embodiment in other forms within the spirit and scope thereof. For example, it may be used in some pipe fittings which operate essentially as does a nut, and such members are regarded as the equivalent of nuts.

Having thus described our invention, what we desire to claim as new is:

1. An improved lock nut comprising a nut body including two tubular sections arranged in axial alignment with the end face of one section opposed in abutting relationship to the end face of the other section, one of said tubular sections having its respective end face interrupted to form a pair of diametrically opposed key ways of inverted T-form extending entirely through the side wall portions of the tubular section, the other of said tubular sections having its respective end portion formed with axially projecting key portions which are externally complementary in shape with the diametrically opposed key ways and adapted to be received therein by relative transverse movement of the parts, one of said sections being internally threaded and the other section being formed of self-threading material.

2. An improved lock nut comprising a nut body including two tubular sections arranged in axial alignment with the end face of one section opposed in adjacent relationship to the end face of the other section, one of said tubular sections having its respective end face interrupted to form a pair of diametrically opposed key ways of inverted T-form extending entirely through the side wall portions of the tubular section, the other of said tubular sections having its respective end portion formed with axially projecting key portions which are externally complementary in shape with the diametrically opposed key ways and adapted to be received therein by relative transverse movement of the parts, said sections being internally threaded, and a third member of pre-formed self-threading material interposed between said sections throughout their adjacent faces to space said sections and providing self-threading surfaces.

SYDNEY T. FARRELL.
FREDERICK L. FARRELL.

REFERENCES CITED

The following references are of record in the file of this patent:

UNITED STATES PATENTS

| Number | Name | Date |
|---|---|---|
| 298,843 | Gissinger | May 20, 1884 |
| 1,792,329 | Smith | Feb. 10, 1931 |
| 2,324,731 | Simmonds | July 20, 1943 |
| 2,333,388 | Poupitch | Nov. 2, 1943 |
| 2,377,186 | Saleh | May 29, 1945 |
| 2,390,759 | Warren | Dec. 11, 1945 |

FOREIGN PATENTS

| Number | Country | Date |
|---|---|---|
| 389,382 | Germany | Feb. 7, 1924 |